US009711891B2

(12) United States Patent
Taniguchi et al.

(10) Patent No.: US 9,711,891 B2
(45) Date of Patent: Jul. 18, 2017

(54) ELECTRICAL JUNCTION BOX WITH VENTILATION HOLE IN A HOOD PORTION

(71) Applicants: SUMITOMO WIRING SYSTEMS, LTD., Yokkaichi-shi, Mie (JP); TOYOTA JIDOSHA KABUSHIKI KAISHA, Toyota-shi, Aichi-ken (JP)

(72) Inventors: Takayuki Taniguchi, Yokkaichi (JP); Kazuya Komaki, Yokkaichi (JP); Jiro Ito, Toyota (JP)

(73) Assignees: SUMITOMO WIRING SYSTEMS, LTD., Mie (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/066,711

(22) Filed: Mar. 10, 2016

(65) Prior Publication Data

US 2016/0295714 A1    Oct. 6, 2016

(30) Foreign Application Priority Data

Mar. 30, 2015 (JP) .................................. 2015-069323

(51) Int. Cl.
*H01R 13/52* (2006.01)
*B60R 16/023* (2006.01)

(52) U.S. Cl.
CPC ......... *H01R 13/52* (2013.01); *B60R 16/0238* (2013.01)

(58) Field of Classification Search
CPC ............................ H01R 13/52; B60R 16/0238
USPC ..... 439/76.1, 76.2, 686–690, 695, 696, 731, 439/732, 901, 904, 906
See application file for complete search history.

(56) References Cited

U.S. PATENT DOCUMENTS

| 7,736,158 | B2 * | 6/2010 | Yamaguchi | ............ H05K 7/026 439/271 |
| 7,978,459 | B2 | 7/2011 | Nakanishi et al. | |
| 2009/0142940 | A1 * | 6/2009 | Ikeda | ........................ H05K 1/18 439/76.2 |
| 2012/0033392 | A1 * | 2/2012 | Golubovic | .............. H02S 40/34 361/752 |
| 2013/0109203 | A1 * | 5/2013 | Nakanishi | ........... B29C 45/1671 439/65 |
| 2014/0218862 | A1 * | 8/2014 | Hashikura | ........... B60R 16/0238 361/688 |

FOREIGN PATENT DOCUMENTS

| JP | 2000-228243 A | 8/2000 |
| JP | 2000-332438 A | 11/2000 |

(Continued)

OTHER PUBLICATIONS

Jun. 14, 2016 Office Action issued in Japanese Patent Application No. 2015-069323.

*Primary Examiner* — Harshad Patel
(74) *Attorney, Agent, or Firm* — Oliff PLC

(57) ABSTRACT

An electrical junction box includes a circuit board and a case. The case holds the circuit board therein. The case includes case components bonded to each other such that the case components are liquid-tight to each other. One of the case components includes a connector portion that is liquid-tight to another portion of the one of the case components. The connector portion includes a hood portion to which a mating connector is to be connected. The hood portion includes a ventilation hole that communicates with internal space of the case.

6 Claims, 12 Drawing Sheets

(56) References Cited

FOREIGN PATENT DOCUMENTS

| | | |
|---|---|---|
| JP | 2009-291043 A | 12/2009 |
| JP | 2011-239560 A | 11/2011 |
| JP | 2013-206969 A | 10/2013 |
| WO | 2012/011395 A1 | 1/2012 |

* cited by examiner

ELECTRICAL JUNCTION BOX WITH VENTILATION HOLE IN A HOOD PORTION

CROSS REFERENCE TO RELATED APPLICATION

This application claims priority from Japanese Patent Application No. 2015-069323 filed on Mar. 30, 2015. The entire contents of the priority application are incorporated herein by reference.

TECHNICAL FIELD

The present disclosure relates to an electrical junction box.

BACKGROUND

A known electrical junction box includes a circuit board housed in a circuit case that includes a ventilation hole. Portions of the case except for the ventilation hole are liquid-tight. According to the configuration, water resistance of the electrical junction box improves while maintaining air permeability.

Because the case described above includes the ventilation hole, foreign substances such as bugs or duct may enter into the case through the ventilation hole, which may result in malfunction of the circuit board.

The present invention was accomplished in view of the foregoing circumstances. An object of the present invention is to provide an electrical junction box that has a configuration to restrict entrance of foreign substances.

SUMMARY

An electrical junction box includes a circuit board and a case. The case holds the circuit board therein. The case includes case components bonded to each other such that the case components are liquid-tight to each other. One of the case components includes a connector portion that is liquid-tight to another portion of the one of the case components. The connector portion includes a hood portion to which a mating connector is to be connected. The hood portion includes a ventilation hole that communicates with internal space of the case.

DETAILED DESCRIPTION

Embodiment

1. Overall Configuration of Electrical Junction Box

An electrical junction box 10 for a vehicle will be described with reference to FIGS. 1 to 12.

Figure 1:
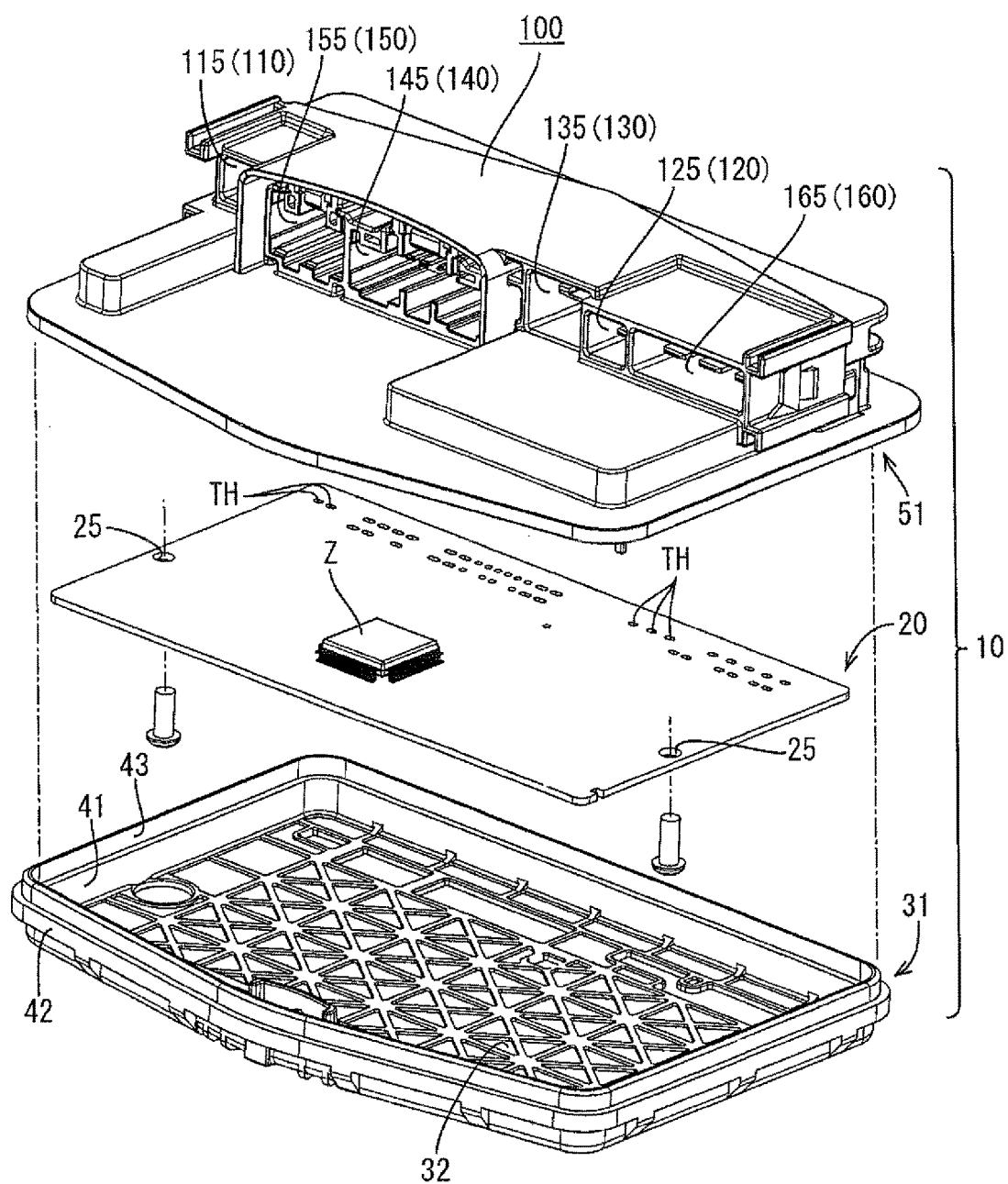
FIG. 1 is a perspective view of an electrical junction box according to an embodiment.

As illustrated in FIG. 1, the electrical junction box 10 includes a circuit board 20 and a case 30. The circuit board 20 includes a printed circuit board and an electronic component Z that is mounted on the printed circuit board. The circuit board 20 has a rectangular shape and includes conductive lines (not illustrated) formed using wire printing technology. Moisture-proof insulating coating is applied to the circuit board 20 after the electronic component Z is mounted thereon. For instance, liquid resin is sprayed on the circuit board 20 to form a thin film on the circuit board 20. With the coating, moisture is less likely to affect electrical performance of the circuit board 20.

The case 30 holds the circuit board 20 therein. The case 30 includes a holding member (a case component) 31 and a covering member (a case component) 51. The holding member 31 is made of synthetic resin (e.g., thermoplastic such as polybutylene terephthalate and polypropylene). The holding member 31 includes a bottom plate 32 and a peripheral wall 41 that projects from a peripheral edge of the bottom plate 32 at an angle to the bottom plate 32. The holding member 31 has a shallow box-like shape (a tray-like shape). The bottom plate 32 of the holding member 31 is slightly larger than the circuit board 20. A middle of a lower edge portion of the bottom plate 32 projects downward, that is, the bottom plate 32 has a pentagonal shape.

The peripheral wall 41 is formed for an entire periphery of the bottom plate 32. A flange 42 extends outward from a top end of the peripheral wall 41 for an entire periphery of the peripheral wall 41. A projecting wall 43 projects from a top surface of the flange 42. The projecting wall 43 extends without any breaks for an entire peripheral wall 41 so as to form a ring-like shape. The peripheral wall 41 functions as a surrounding wall that surrounds the circuit board 20 from four directions.

The covering member 51 is made of synthetic resin (e.g., thermoplastic such as polybutylene terephthalate and polypropylene). The covering member 51 has a pentagonal shape to cover an opening of the holding member 31. The covering member 51 is slightly larger than the holding member 31. When the covering member 51 is placed over the opening of the holding member 31, a distal end of the projecting wall 43 of the holding member 31 is in contact with a portion of the rear surface of the covering member 51 slightly inner than the peripheral edge. The covering member 51 includes two supporting bosses 59 that project from the inner surface opposite the bottom plate 32 of the holding member 31. The supporting bosses 59 are located at ends of the width of the inner surface. The circuit board 20 is screwed to the supporting bosses 59.

The covering member 51 includes a connector block 100 (a connector portion) formed in an upper portion of the covering member 51 on the outer side. The connector block 100 is liquid-tight to other portions of the covering member 51. The connector block 100 has a horizontally-long shape that extends an entire width of the covering member 51. The connector block 100 includes six hood portions 115, 125, 135, 145, 155, and 165 arranged along the width direction of the connector block 100. The hood portions 115, 125, 135, 145, 155, and 165 are portions of connectors 110, 120, 130, 140, 150, and 160, respectively. The hood portions 115 to 165 of the connectors 110 to 160 include fitting holes to which connectors 71 are to be inserted, respectively. Openings of the fitting holes are located at the lower ends of the hood portions 115 to 165. The lower ends refer to ends of the hood portions 115 to 165 closer to the lower edge of the electrical junction box 10 in a position when the electrical junction box 10 is installed in a vehicle. In FIG. 1, the hood portions 115 open toward a viewer. The connectors 71 are to be inserted in the respective fitting holes from the lower side.

Figure 5:
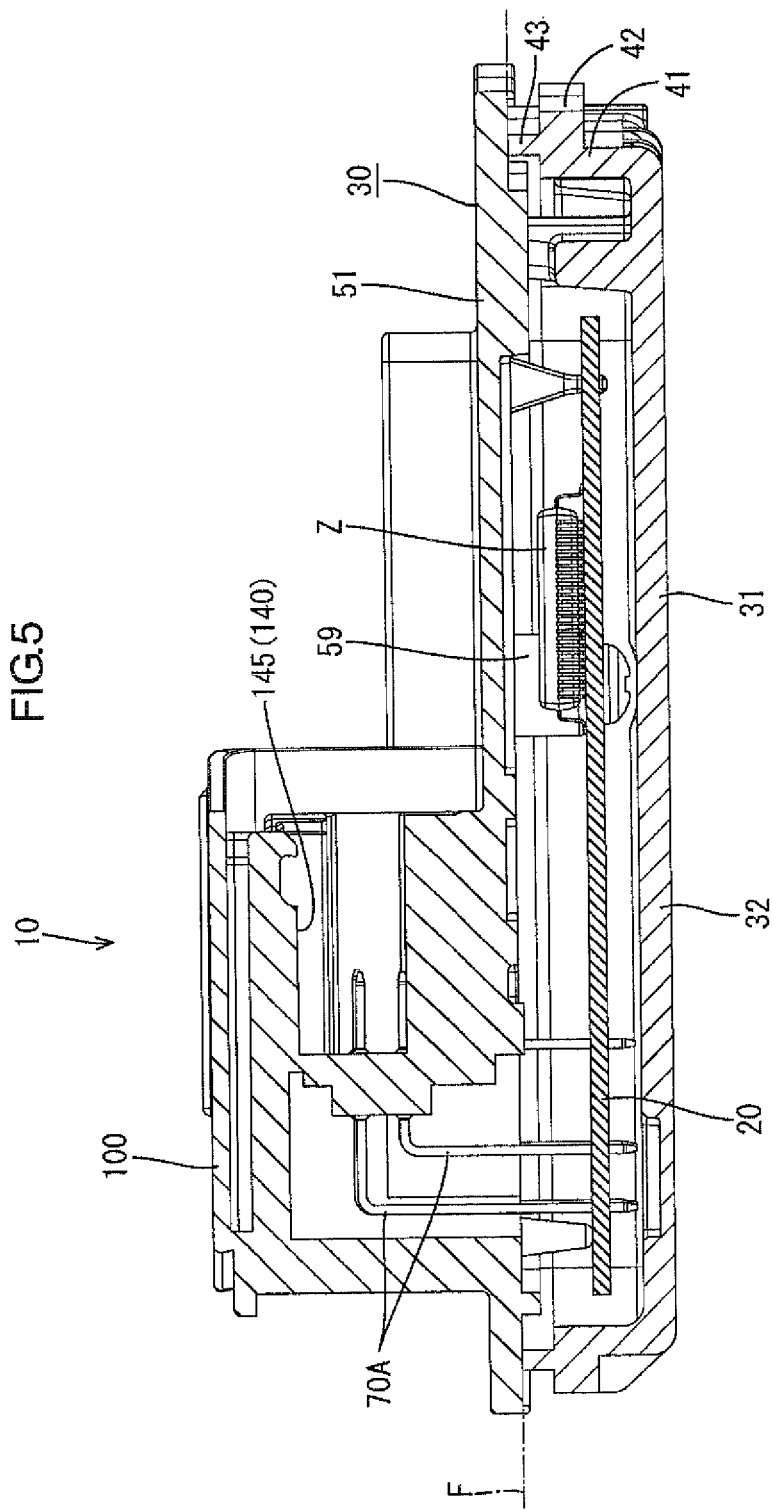
FIG. 5 is a cross-sectional view along line V-V in FIG. 3.
Figure 6:
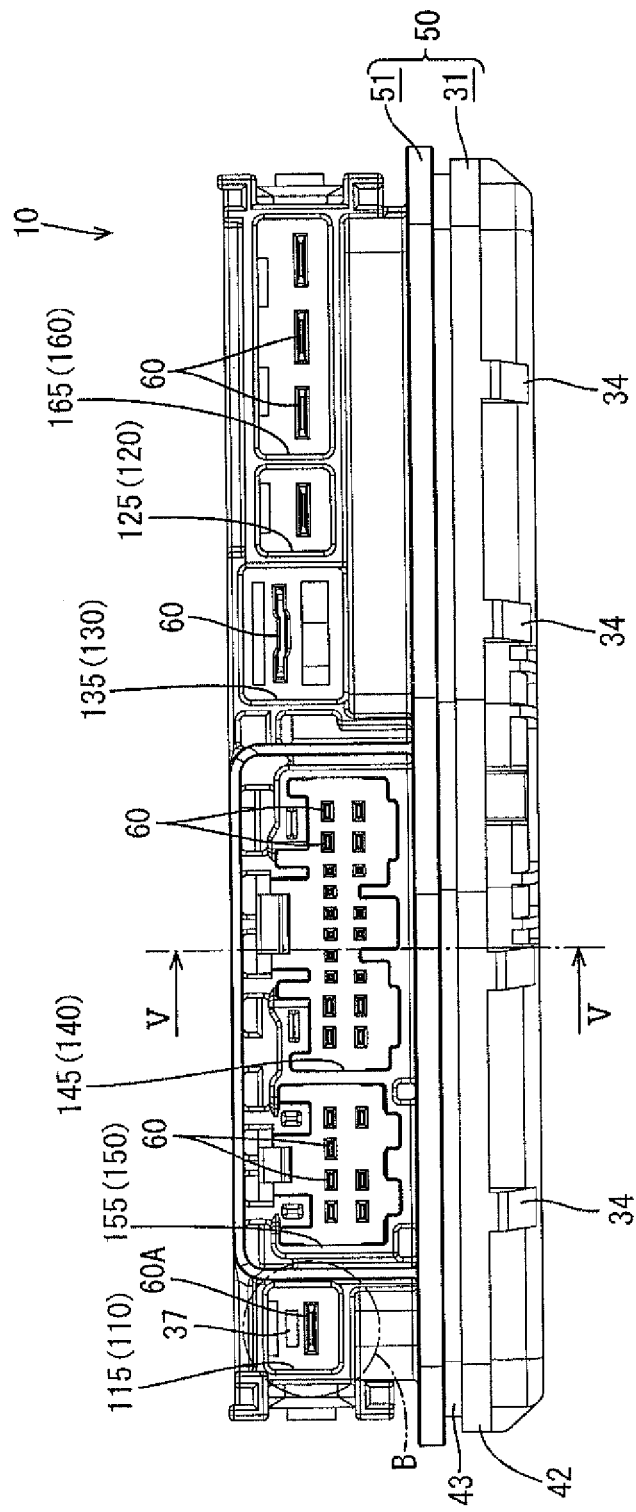
FIG. 6 is a front view of the electrical junction box.

The connector block 100 is provided with bus bars 70A by insert molding. The bus bars 70A are L-shaped metal plates. As illustrated in FIG. 5, the bus bars 70A include end portions that project in the hood portions 115 to 165, respectively. The end portions of the bus pars 70A projecting in the hood portions 115 to 165 are terminals 60. Other end portions of the bus bars 70A extend to the circuit board 20 such that the other end portions are inserted in through holes TH in the circuit board 20, respectively.

The circuit board 20 is mounted to the back surface of the covering member 51. The covering member 51 is attached to the holding member 31 that holds the circuit board 20 therein such that the covering member 51 covers the opening of the holding member 31. The covering member 51 closes the holding member 31. The covering member 51 is welded to the projecting wall 43 by vibration welding. Mating surfaces F of the holding member 31 and the covering member 51 are sealed with each other. The projecting wall 43 is a mating edge that extends without any breaks for an entire periphery of the holding member 31. Therefore, the mating surfaces F of the holding member 31 and the covering member 51 are completely liquid-tight for the entire peripheries thereof.

Figure 4:
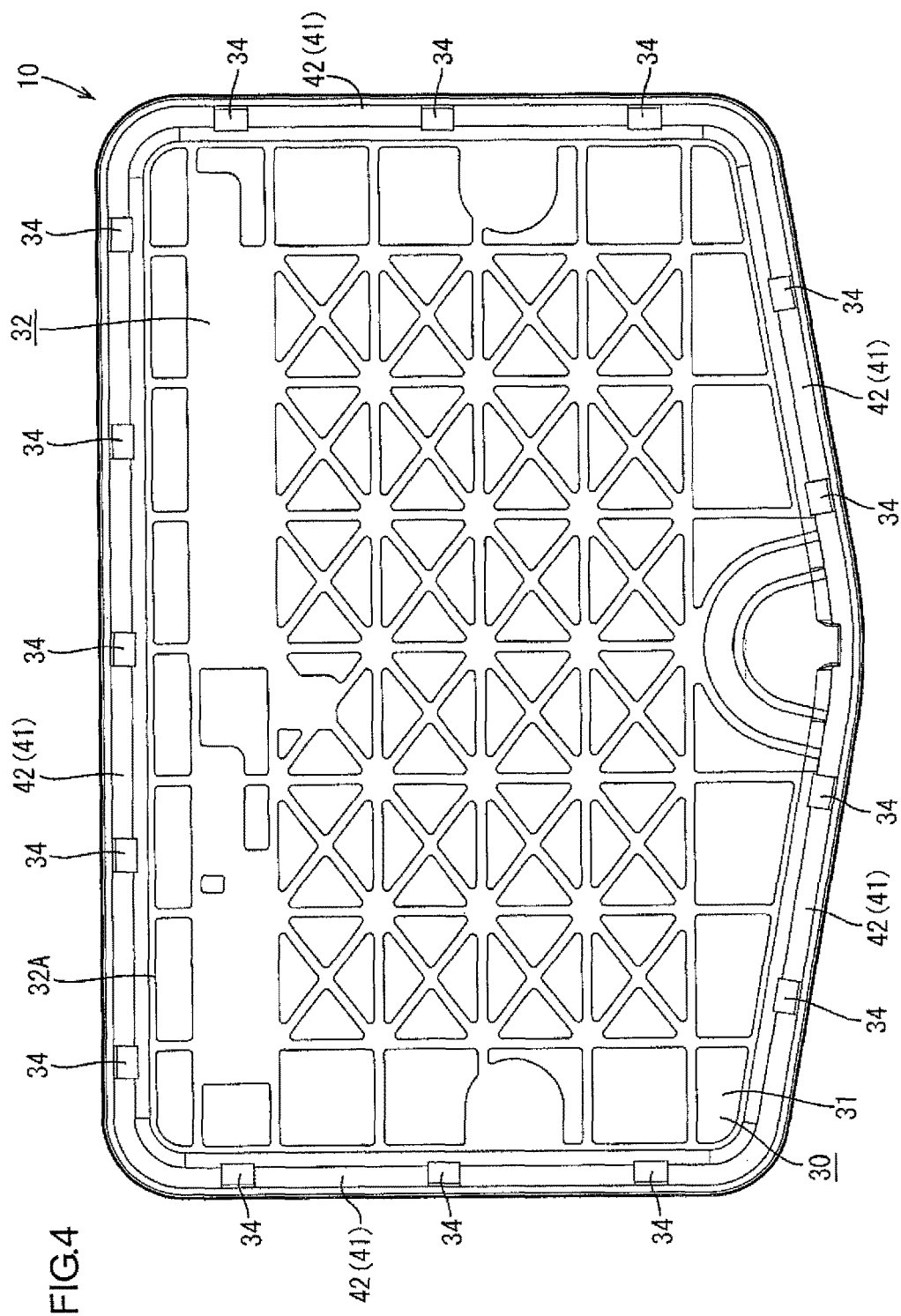
FIG. 4 is a bottom view of the electrical junction box.

The back of the electrical junction box 10 is illustrated in FIG. 4. As illustrated in FIG. 4, a guide slopes 34 are formed an outer surface of the bottom plate 32 of the holding member 31. The guide slopes 34 are arranged at intervals along an outer peripheral edge 32a of the bottom plate 32. The guide slopes 34 are for guiding the electrical junction box 10 to an attachment (not illustrated) of a vibration welding machine during setting of the electrical junction box 10 in the attachment.

2. Ventilation Hole

Figure 2:
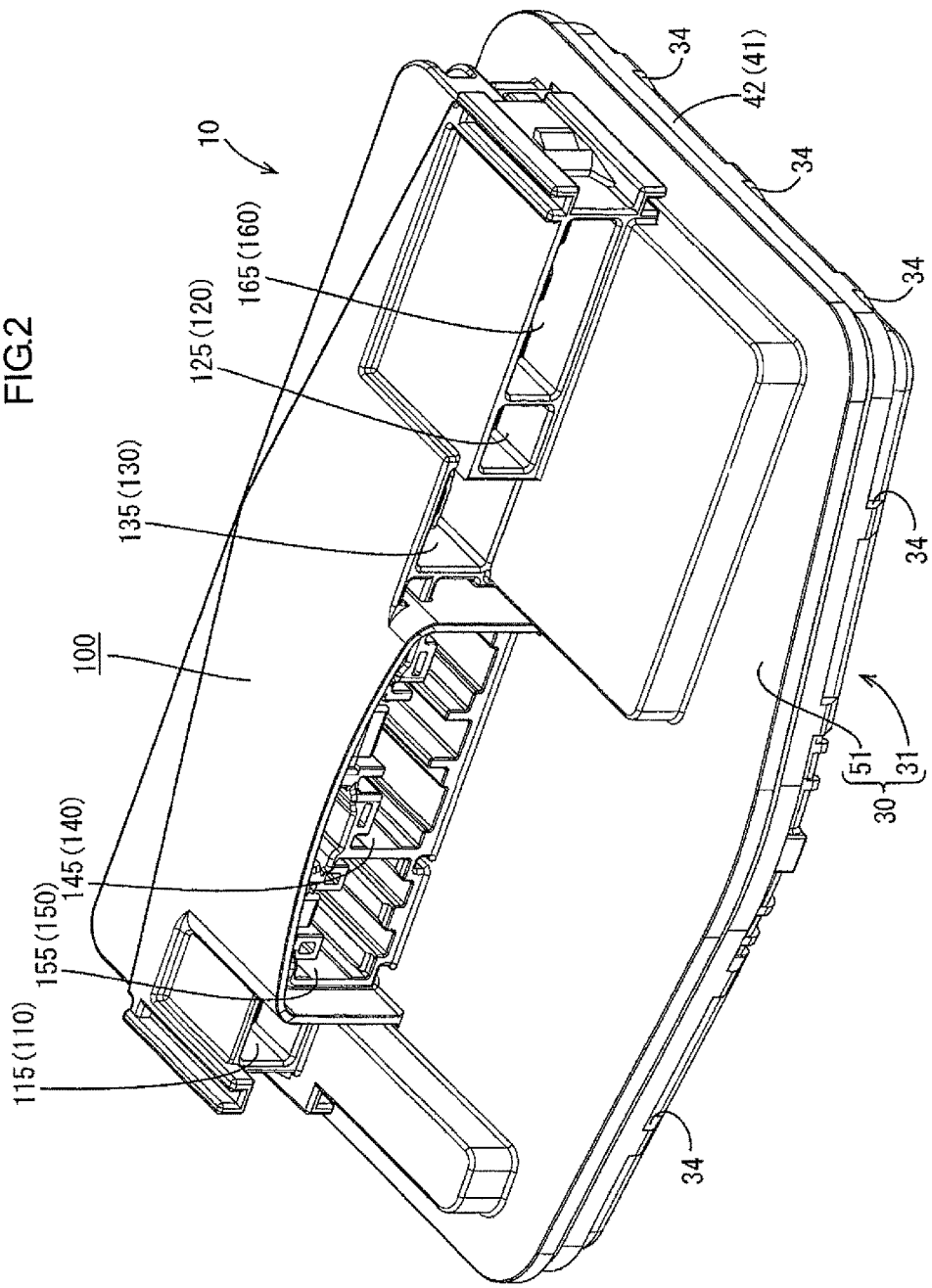
FIG. 2 is a perspective view of the electrical junction box.
Figure 3:
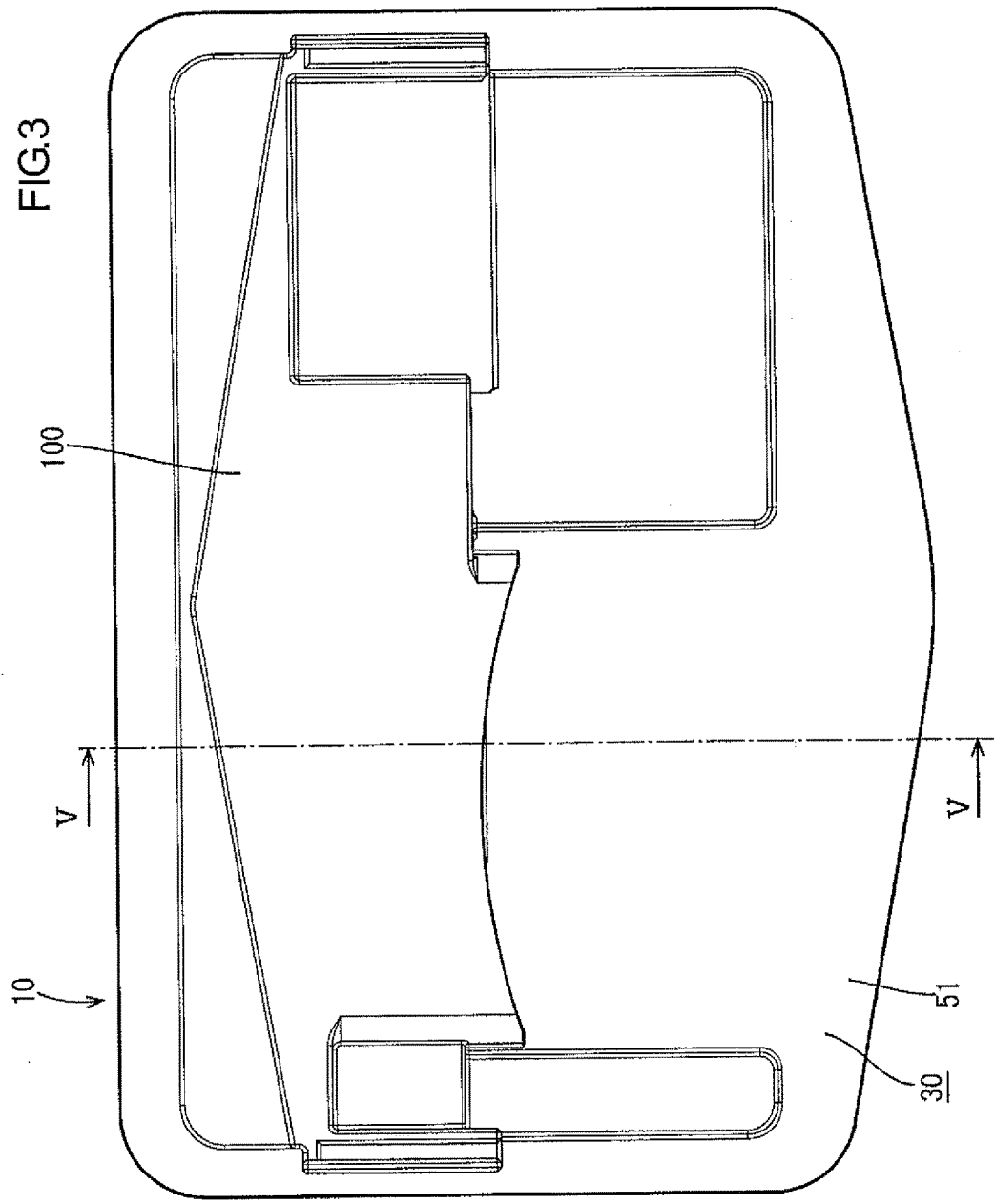
FIG. 3 is a plan view of the electrical junction box.
Figure 8:
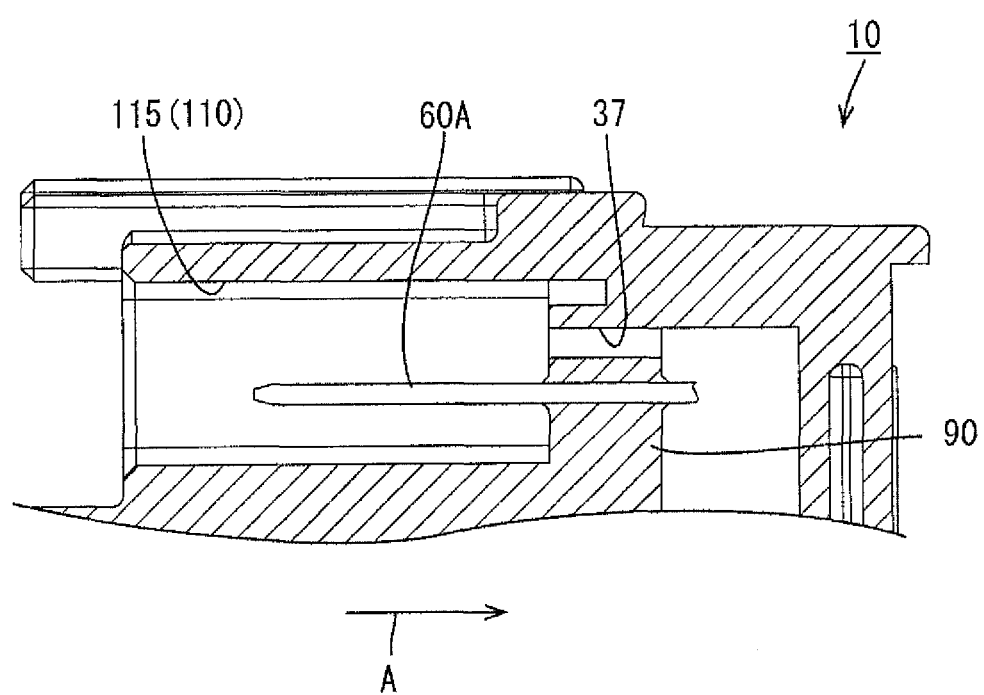
FIG. 8 is a cross-sectional view along line VIII-VIII in FIG. 7.
Figure 9:
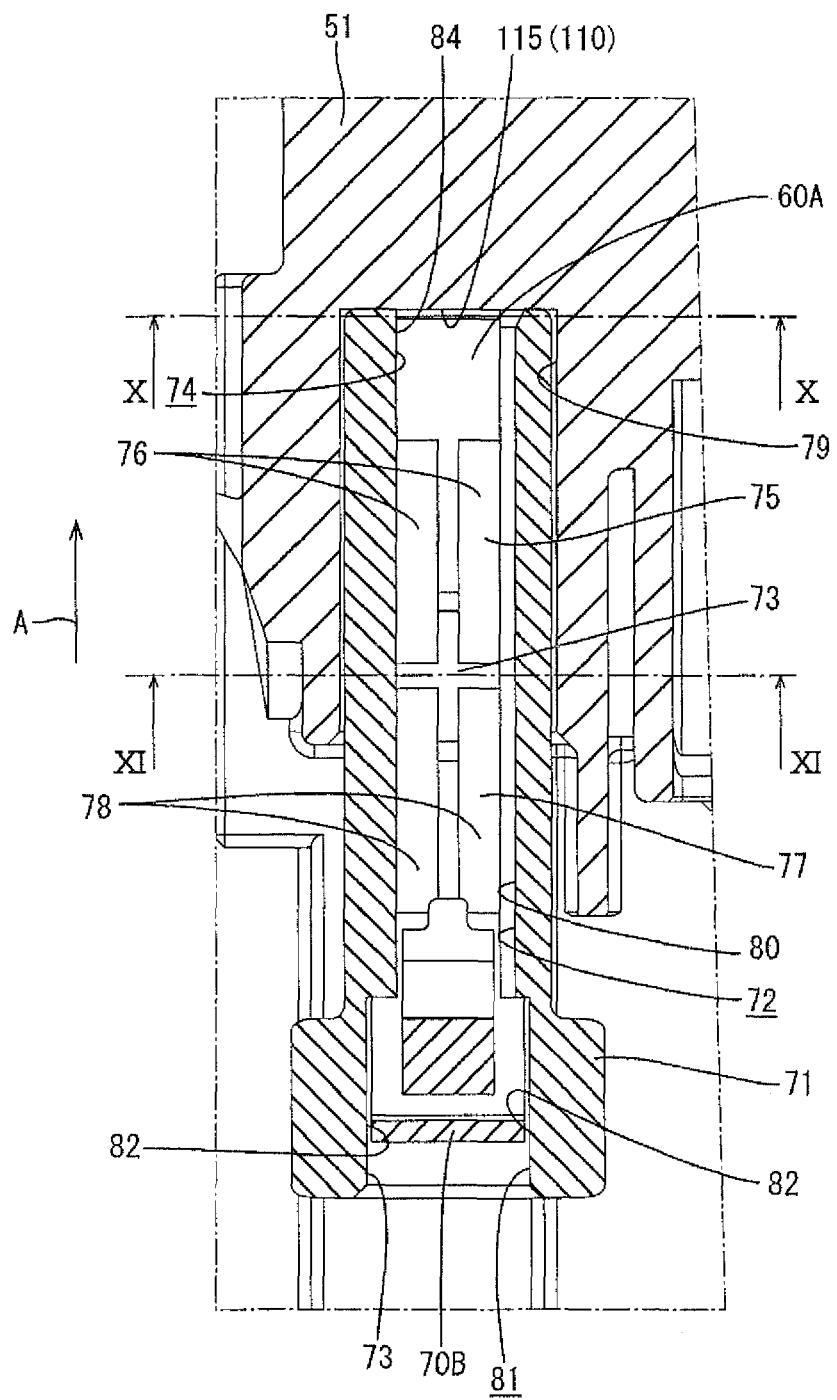
FIG. 9 is a cross-sectional view along line IX-IX in FIG. 7.

One terminal 60A is disposed inside the hood portion 115 that is located at the leftmost in FIG. 2. As illustrated in FIG. 8, the terminal 60A projects into the inside of the hood portion 115 through a bottom wall 90 of the hood portion 115. The terminal 60A and the hood portion 115 are liquid-tight to each other. In FIG. 8, a portion of the terminal 60A extending from the inside of the hood portion 115 to the inside of the case 30 is not illustrated.

Figure 7:
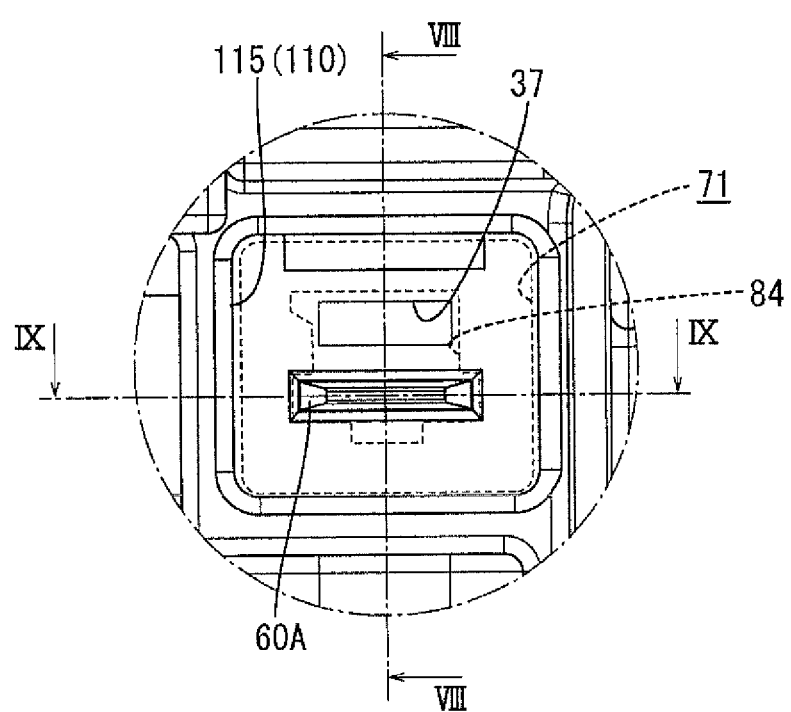
FIG. 7 is a magnified partial view illustrating area B in FIG. 6.

The hood portion 115 includes a ventilation hole 37 that communicates with space inside the case 30 and space inside the hood portion 115. As illustrated in FIG. 7, the ventilation hole 37 is formed in a horizontally-long rectangular shape when viewed from the front in a mating direction A. A dimension of the ventilation hole 37 on a plane perpendicular to the mating direction A is defined such that air flows between the inside and the outside of the case 30 due to differences in air pressure between the inside and the outside of the case 30 or differences in temperature between the inside and the outside of the case 30.

The bottom wall 90 of the hood portion 115 includes the ventilation hole 37 on the other side of the terminal 60A with respect to the circuit board 20. In FIG. 8, the ventilation hole 37 is located above the terminal 60A.

3. Mating Connector

The hood portion 115 of the electrical junction box 10 is configured such that a mating connector 71 made of synthetic resin is inserted into the hood portion 115. The mating connector 71 includes a cavity 72 that is internal space of the mating connector 71 and a relay terminal 73 that is electrically connected to the terminal 60A in the hood portion 115. The relay terminal 73 is an example of a mating terminal.

The mating connector 71 includes a communicating hole 74 at the front end in the mating direction of the mating connector 71. The communicating hole 74 communicates with the cavity 72. The terminal 60A in the hood portion 115 is inserted into the communicating hole 74 and to the cavity 72.

When the mating connector 71 is mated with the connector 110, the ventilation hole 37 of the connector 110 is positioned inner than an opening 84 of the communicating hole 74. Therefore, the internal space of the electrical junction box 10 and the cavity 72 of the mating connector 71 communicate with each other.

The relay terminal 73 has an elongated shape that extends along the mating direction A of the mating connector 71. The relay terminal 73 is prepared by forming a metal plate made of copper or copper alloy into a predetermined shape by pressing. The relay terminal 73 includes a front connecting portion 75 at the front end in the mating direction A. The font connecting portion 75 is connected to the terminal 60A in the hood portion 115. The front connecting portion 75 includes a pair of front springs 76 projecting in a direction perpendicular to the mating direction A. The front springs 76 are formed by curving portions of the front connecting portion inward.

The relay terminal 73 includes a rear connecting portion 77 at the rear end in the mating direction A. The rear connecting portion 77 is connected to the bus bar 70B (an example of the mating terminal). The rear connecting portion 77 includes a pair of rear springs 78. The rear springs 78 have a configuration similar to that of the front springs 76. The bus bar 70B connected to the rear springs 78 is in the cavity 72 of the mating connector 71.

When the mating connector 71 is connected to the connector 110, a first clearance 79 is provided between the outer surface of the mating connector 71 and the inner surface of the hood portion 115 of the connector 110. The first clearance 79 communicates with the ventilation hole 37 of the connector 110.

A second clearance 80 is provided between the inner surface of the cavity 72 of the mating connector 71 and the outer surface of the relay terminal 73, and between the inner surface of the cavity 72 of the mating connector 71 and the outer surface of the bus bar 70B. The second clearance 80 communicates with the ventilation hole 37 of the connector 110.

At the rear end of the mating connector 71 in the mating direction A, a lead-out hole 81 that communicates with the cavity 72 is provided. A portion of the bus bar 70B is in the lead-out hole 81. A portion of the bus bar 70B in the cavity 72 extends along the mating direction A. The bus bar 70B is bent substantially at a right angle and the portion of the bus bar 70B in the lead-out hole 81 extends along a direction perpendicular to the mating direction A (toward the viewer in FIG. 9). A foreign substance blocking portion 82 is defined by inner walls of the lead-out hole 81 around an opening of the lead-out hole 81 and side surfaces of the bus bar 70B. The foreign substance blocking portion 82 is for restricting entrance of foreign substances, such as bugs and dust, through the lead-out hole 81 of the mating connector 71, the cavity 72 of the mating connector 71, the communicating hole 74 of the mating connector 71, the ventilation hole 37 of the connector 110, and the inner space of the case 30.

Cross Section Along Line X-X

Figure 10:
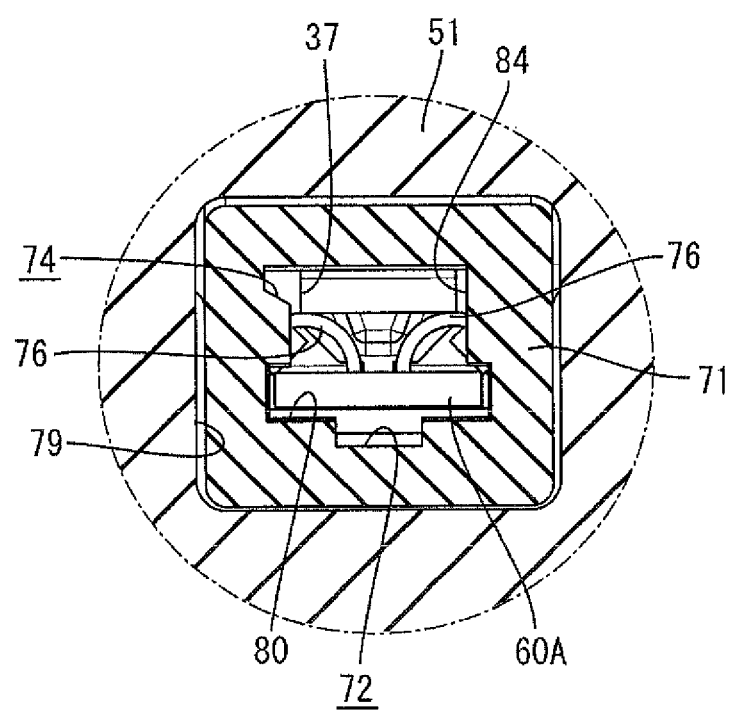
FIG. 10 is a cross-sectional view along line X-X in FIG. 9.

As illustrated in FIG. 10, when the mating connector 71 is connected to the connector 110, the first clearance 79 is formed between the outer surface of the mating connector 71 and the inner surface of the connector 110. Furthermore, the second clearance 80 is formed between the inner surface of the cavity 72 of the mating connector 71 and the relay terminal 73. As illustrated in FIG. 1, dimensions of the first clearance 79, the second clearance 80, and the communicating hole 74 are defined such that a sum of the dimensions of the first clearance 79, the second clearance 80, and the communicating hole 74 on a plane perpendicular to the mating direction A (the cross section along line X-X in FIG. 9) is larger than a dimension of the ventilation hole 37 of the connector 110 on a plane perpendicular to the mating direction A.

Cross Section Along Line XI-XI

Figure 11:
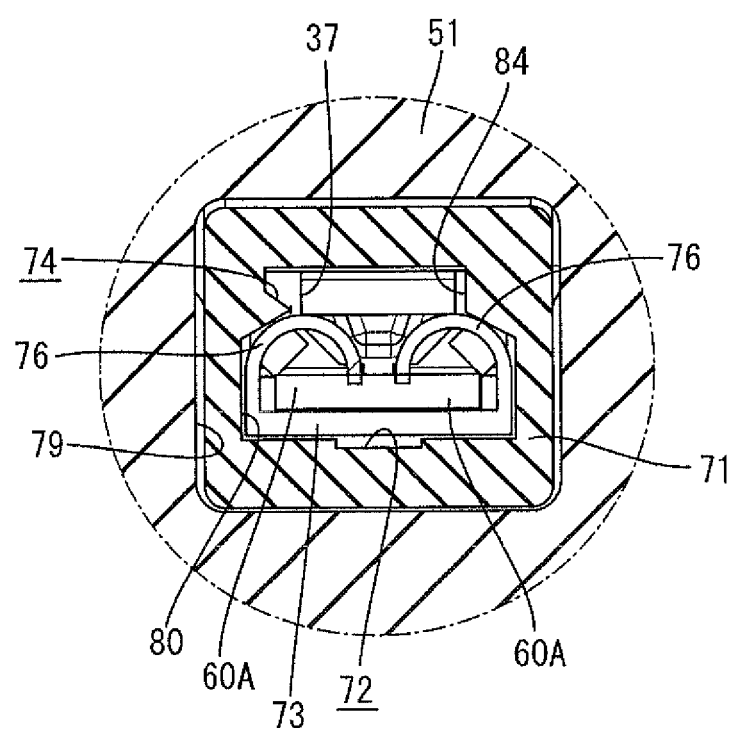
FIG. 11 is a cross-sectional view along line XI-XI in FIG. 9.

As illustrated in FIG. 11, when the mating connector 71 is connected to the connector 110, the clearance 79 is formed between the outer surface of the mating connector 71 and the inner surface of the connector 110. Furthermore, the second clearance 80 is formed between the inner surface of the cavity 72 of the mating connector 71 and the relay terminal 73. As illustrated in FIG. 11, dimensions of the first clearance 79, the second clearance 80, and the communicating hole 74 are defined such that a sum of the dimensions of the first clearance 79, the second clearance 80, and the communicating hole 74 on a plane perpendicular to the mating direction A (the cross section along line XI-XI in FIG. 9) is larger than a dimension of the ventilation hole 37 of the connector 110 on a plane perpendicular to the mating direction A.

Figure 12:
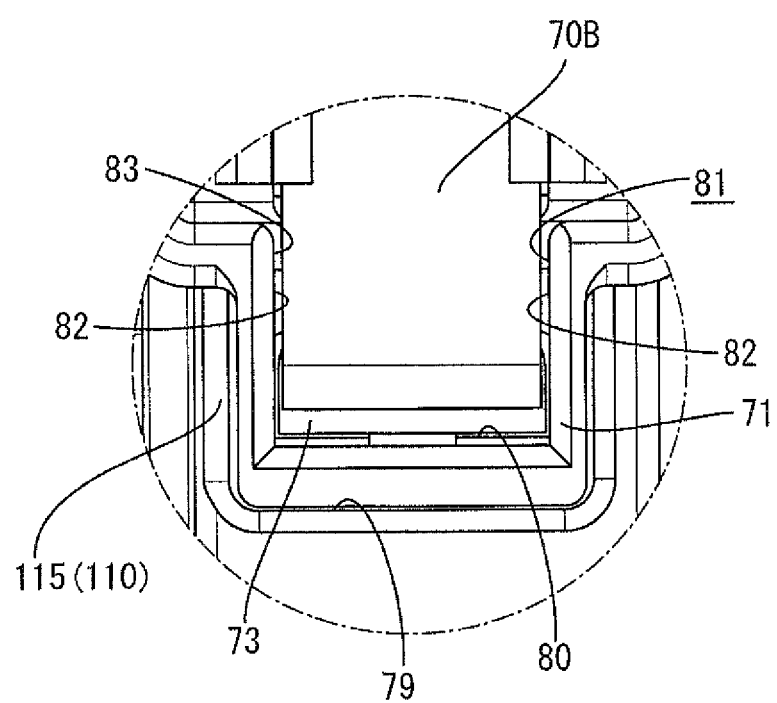
FIG. 12 is a magnified partial front view illustrating a connector and a mating connector that are connected to each other.

As illustrated in FIG. 12, the bus bar 70B extends into the lead-out hole 81 formed at the rear end of the mating connector 71 in the mating direction A. The bus bar 70B is bent in the direction perpendicular to the mating direction A (the upper side in FIG. 12). As described earlier, the foreign substance blocking portion 82 is defined by the side surfaces of the bus bar 70B and the inner surfaces of the lead-out hole 81 of the mating connector 71 around the opening 83. The dimension of the foreign substance blocking portion 82 on the plane perpendicular to the mating direction A is equal to or larger than the dimension of the ventilation hole 37 of the connector 110 on the plane perpendicular to the mating direction A.

The dimension of the foreign substance blocking portion 82 on the plane perpendicular to the mating direction A is smaller than the dimension of the first clearance 79 on the plane perpendicular to the mating direction A in a portion other than the portion that includes the foreign substance blocking portion 82.

The dimension of the foreign substance blocking portion 82 on the plane perpendicular to the mating direction A is smaller than the dimension of the second clearance 80 on the plane perpendicular to the mating direction A in a portion other than the portion that includes the foreign substance blocking portion 82.

4. Assembly Steps

Steps of assembling the electrical junction box 10 will be described. First, the circuit board 20 is fixed to the covering member 51. Specifically, as illustrated in FIG. 5, the circuit board 20 is held in a position such that the surface 21 on which the electrical component Z is mounted faces the covering member 51 and positioned such that the insertion holes 25 in the board are aligned with the supporting bosses 59 of the covering member 51. Then, the circuit board 20 is screwed to the supporting bosses 59 and thus the circuit board 20 is fixed to the covering member 51 with a distance away from the covering member 51 by the height of the supporting bosses 59. In this condition, the bus bars 70A of the connectors 110 to 160 of the covering member 51 are inserted in the through holes TH in the circuit board 20.

The bus bars 70A in the through holes TH are soldered to electrically connect the bus bars 70A to the conductive lines (not illustrated) on the circuit board 20.

The covering member 51 is placed over the holding member 31 and attached. Through the steps, the circuit board 20 fixed to the back surface of the covering member 51 is held inside the holding member 31 and the holding member 31 is closed with the covering member 51.

The electrical junction box 10 is held in the horizontal position with the attachment (not illustrated). A force is applied to the periphery of the electrical junction box 10 with a horn tool in a vibration welding machine (not illustrated) and vibrations in the horizontal direction are applied to the electrical junction box 10. As a result, the top of the projecting wall 43 of the holding member 31 is melted by friction heat produced through the vibrations and bonded to the back surface of the covering member 51. The mating surfaces F of the holding member 31 and the covering member 51 are bonded together for the entire peripheries thereof. The assembly of the electrical junction box 10 is complete.

The electrical junction box 10 is mounted to a box installed in an engine room of a vehicle (corresponding to a mounting portion, not illustrated). The mating connector 71 is a receiving connector in the box. The electrical junction box 10 is held in the vertical position such that the plate surface of the circuit board 20 is along a direction of gravity and mounted. The hood portion 115 of the connector 110 is held in a position such that the opening thereof is at the bottom with respect to the direction of gravity when the electrical junction box 10 is mounted to the box.

When the electrical junction box 10 is mounted to the box and the mating connectors 71 that are connected to a power source and electric components to the hood portion 115 to 165 of the connectors 110 to 160 from below, power supplied by the power source can be distributed to the electric component via the electrical junction box 10. Furthermore, the distribution of the power can be controlled by the electrical junction box 10.

Next, functions and effects of this embodiment will be described. The electrical junction box 10 includes the circuit board 20 and the case 30. The case 30 holds the circuit board 20 therein. The case 30 includes the holding member 31 and the covering member 51 that are bonded to each other such that they are liquid-tight to each other. The covering member 51 includes the connector 110 that is liquid-tight to other portions of the covering member 51. The connector 110 includes the hood portion 115 to which the mating connector is connected and the ventilation hole 37 for communicating the hood portion 115 to the internal space of the case 30.

In this embodiment, the holding member 31 and the covering member 51 of the case 30 are bonded to each other such that they are liquid-tight. Therefore, moisture is less likely to enter between the holding member 31 and the covering member 51.

In this embodiment, air flows between the inside and the outside of the case 30 through the ventilation hole 37. Namely, the electrical junction box 10 has proper ventilation. According to the configuration, an air pressure inside the case 30 and an air pressure outside the case 30 are substantially equal to each other. Furthermore, moisture condensation is less likely to occur inside the case 30.

The ventilation hole 37 is formed in the hood portion 115 to which the mating connector 71 is connected. The space between the outer surface of the mating connector 71 and the inner surface of the hood portion 115 is relatively small. Therefore, foreign substances such as bugs and dust are less likely to reach the ventilation hole 37, that is, the foreign substances are less likely to enter the case 30.

In this embodiment, the terminal 60A is disposed inside the hood portion 115. Even if moisture condensation occurs inside the hood portion 115, short circuit due to the moisture condensation is less likely to occur.

In this embodiment, the communicating hole 74 that communicates with the internal space of the mating connector 71 at the top end of the mating connector 71 in the mating direction A. When the mating connector 71 is connected to the connector 110, the ventilation hole 37 is located inner than the opening 84 of the communicating hole 74. According to the configuration, the ventilation hole 37 is less likely to be blocked by the mating connector 71. Therefore, the electrical junction box 10 has proper ventilation.

In this embodiment, when the mating connector is connected to the connector 110, the first clearance 79 is formed between the outer surface of the mating connector 71 and the inner surface of the connector 110. The mating connector 71 includes the mating terminal. The second clearance 80 is formed between the inner surface of the mating connector 71 and the outer surface of the mating terminal. The first clearance 79 and the second clearance 80 communicate with the ventilation hole 37. According to the configuration, air circulates in and out of the case 30 through the ventilation hole 37, the first clearance 79, and the second clearance 80. Therefore, the electrical junction box 10 has proper ventilation.

In this embodiment, the sum of the dimensions of the first clearance 79 on the plane perpendicular to the meting direction A of the mating connector 71 and the connector 110 and the second clearance 80 on the plane perpendicular to the meting direction A is equal to or larger than the dimension of the ventilation hole 37 on the plane perpendicular to the mating direction A. Because the dimension of the ventilation hole 37 is sufficiently large for circulating the air inside the case 30, the electrical junction box 10 has proper ventilation. Therefore, efficiency in design of the electrical junction box 10 improves.

In this embodiment, at least one of the first clearance 79 and the second clearance 80 includes the foreign substance blocking portion 82 that has the dimension on the plane perpendicular to the mating direction A of the mating connector 71 smaller than other portions. With the foreign substance blocking portion 82, the foreign substances are less likely to enter into the internal space of the case 30.

In this embodiment, the mating terminals include the bus bar 70B and the mating connector 71 includes the lead-out hole 81 at the rear end in the mating direction A. The bus bar 70B extends from the rear end portion at the end in the mating direction A into the lead-out hole 81 and then extends in the direction that crosses the mating direction A. The foreign substance blocking portion 82 is defined by the inner surface of the mating connector 71 around the opening 83 of the lead-out hole 81 and the side surface of the bus bar 70B that is the mating terminal. In comparison to a configuration in which the foreign substance blocking portion 82 is defined with a member other than the mating connector 71 and the mating terminal (e.g., the relay terminal 73 and the bus bar 70B), the number of components is reduced.

In this embodiment, the foreign substance blocking portion 82 is defined by the inner surface of the mating connector 71 around the opening 83 of the lead-out hole 81 and the side surface of the bus bar 70B. The opening 83 of the lead-out hole 81 is at a position the farthest away from the ventilation hole 37 in a path of foreign substances entering toward the ventilation hole 37. Namely, the entrance of the foreign substances into the ventilation hole 37 is restricted at the earliest stage.

OTHER EMBODIMENTS

The technology described herein is not limited to the embodiment described above and in the drawings. The following embodiments may be included in the technical scope of the present invention.

(1) The ventilation hole 37 is not limited to the horizontally-long rectangular shape. The ventilation hole 37 may have any shape including a triangular shape, a quadrangular shape including a rectangular shape, a polygonal shape including a pentagonal shape, a round shape, an oval shape, and an elongated oval shape.

(2) A hood portion in which multiple terminals are disposed including a ventilation hole may be included in the scope of the present invention.

(3) A hood portion including multiple ventilation holes may be included in the scope of the present invention.

(4) Multiple hood portions each including a ventilation hole may be included in the scope of the present invention.

(5) Connectors separately formed from one another may be included in the scope of the present invention.

(6) A case including three, four, or more case components bonded together such that they are liquid-tight may be included in the scope of the present invention.

(7) A holding member and a covering member that are bonded to each other with an adhesive layer or a sealing member such that they are liquid-tight may be included in the scope of the present invention. Any means may be used for connecting the holding member and the covering member such that they are liquid-tight.

The invention claimed is:
1. An electrical connection assembly comprising:
an electrical junction box comprising:
    a circuit board; and
    a case holding the circuit board therein, the case including a plurality of case components bonded to each other such that the case components are liquid-tight to each other, wherein
    one of the case components includes a connector portion that is liquid-tight to another portion of the one of the case components,
    the connector portion includes a hood portion, and the hood portion includes a ventilation hole that communicates with an internal space of the case; and a mating connector connected to the hood portion, the mating connector including an inner space and a communicating hole that is at a front end in a mating direction in which the mating connector is inserted into the hood portion, the communicating hole communicating with the inner space of the mating connector, wherein the ventilation hole is located inner than an opening of the communicating hole.

2. The electrical connection assembly according to claim 1, wherein the connector portion and the mating connector are connected to each other with a first clearance between an inner surface of the connector portion and an outer surface of the mating connector, the mating connector includes a mating terminal disposed with a second clearance between an inner surface of the mating connector and an outer surface of the mating terminal, and the first clearance and the second clearance communicate with the ventilation hole.

3. The electrical connection assembly according to claim 2, wherein the first clearance, the second clearance, and the ventilation hole have dimensions on a plane perpendicular to the mating direction, the dimensions being defined such that a sum of the dimensions of the first clearance and the second clearance is equal to or larger than the dimension of the ventilation hole.

4. The electrical connection assembly according to claim 2 wherein at least one of the first clearance and the second clearance includes a foreign substance blocking portion having a dimension on a plane perpendicular to the mating direction smaller than a dimension of another portion of the at least one of the first clearance and the second clearance on a plane perpendicular to the mating direction.

5. The electrical connection assembly according to claim 4, wherein the mating terminal includes a bus bar, the mating connector includes a lead-out hole into which the bus bar extends at a rear end in the mating direction, the bus bar extends from the rear end of the mating connector along a direction that crosses the mating direction, and the foreign substance blocking portion is defined by an inner surface of the lead-out hole around an opening of the lead-out hole and a side surface of the bus bar.

6. The electrical junction box according to claim 1, further comprising a terminal disposed inside the hood portion.

* * * * *